United States Patent [19]
Berenguel et al.

[11] Patent Number: 5,289,581
[45] Date of Patent: Feb. 22, 1994

[54] DISK DRIVER WITH LOOKAHEAD CACHE

[76] Inventors: Leo Berenguel, 43980 Rosemere Dr.; Weii Lin, 40872 Marty Ter., both of Fremont, Calif. 94539

[21] Appl. No.: 947,370

[22] Filed: Sep. 18, 1992

Related U.S. Application Data

[63] Continuation of Ser. No. 546,601, Jun. 29, 1990, abandoned.

[51] Int. Cl.⁵ .............................................. G06F 12/00
[52] U.S. Cl. .................................... 395/275; 395/425; 364/243.4; 364/243.41; 364/DIG. 1; 364/964.2; 364/DIG. 2
[58] Field of Search ................. 395/275, 425, 700; 364/243.4, 243.41, DIG. 1, 964.2, DIG. 2

[56] References Cited

U.S. PATENT DOCUMENTS

| | | | |
|---|---|---|---|
| 4,161,024 | 7/1979 | Joyce et al. | 364/200 |
| 4,168,541 | 9/1979 | DeKarske | 364/200 |
| 4,423,479 | 12/1983 | Hanson et al. | 364/200 |
| 4,490,782 | 12/1984 | Dixon et al. | 364/200 |
| 4,523,275 | 6/1985 | Swenson et al. | 364/200 |
| 4,819,154 | 4/1989 | Stiffler et al. | 364/200 |
| 4,825,357 | 4/1989 | Ovies et al. | 364/200 |
| 4,916,605 | 4/1990 | Beardsley et al. | 364/200 |
| 5,073,851 | 12/1991 | Masterson et al. | 395/425 |
| 5,097,409 | 3/1992 | Schwartz et al. | 395/425 |
| 5,175,842 | 12/1992 | Totani | 395/425 |

Primary Examiner—Michael R. Fleming
Assistant Examiner—Glenn A. Auve
Attorney, Agent, or Firm—Ron Fish

[57] ABSTRACT

A modified driver program for an external hard disk drive for a personal computer which manages a cache in RAM on the motherboard to speed up disk access operations is disclosed. A block of 2000 bytes contiguous to the driver code is reserved at boot time. An "on/off" data byte flag is managed to indicate whether the data in the cache is valid. For read operations of a size less than the size of the cache, a number of sequential blocks of data from the disk are stored in the cache. Any write operation potentially invalidates the cache data so the flag is set "off". On subsequent read operations, if the cache flag is "on", the driver code compares the contents of the cache to the requested data to see if it is stored in the cache. If it is, the data is read from the cache as opposed to the disk thereby speeding up the access.

14 Claims, 4 Drawing Sheets

DISK DRIVER WITH LOOKAHEAD CACHE

This is a file wrapper continuation application of a U.S. Pat. application Ser. No. 07/546,601, filed Jun. 29, 1990 now abandoned for DISK DRIVER WITH LOOKAHEAD CACHE.

BACKGROUND OF THE INVENTION

The invention pertains to performance improvements for input/output operations with disk drives in personal computers. More particularly, the invention relates to modifications to disk drive software drivers to implement software caches for I/O transactions between Macintosh personal computers and external hard disk drivers.

It has been discovered by the applicants that personal computer software authors tend to write code which reads data blocks stored on hard disk media in sequential order one block at a time. About 50% of the time only one data block of 512 bytes is read on any particular read operation. The requesting application program then does something with the data, and then requests the next block in sequence from the disk a high percentage of the time. Where the particular disk drive being read is an external disk drive outside the chassis of the personal computer, the disk drive will be connected to the personal computer by an interface. In particular, external hard disk drives for the Macintosh personal computer are connected to the CPU by the industry standard SCSI Interface. Each input/output operation with an external hard disk drive via such an interface (the invention is not limited to the SCSI Interface) requires a very large block of time to set up the transaction compared to the actual data transfer time. In particular, for the SCSI Interface and the Macintosh operating system, the overhead time to set up the input/output transaction is on the order of 20 milliseconds while the actual transfer time for the data block is approximately 0.5 milliseconds.

Inefficiency results where blocks of data are requested sequentially one block at a time from an external disk drive connected to the CPU by an interface connector. This is because each block of data so requested has associated therewith an overhead time to set up the transaction which is substantially greater than the time to make the actual data transfer. Accordingly, a need has arisen for a more efficient system for retrieving blocks of data from external hard disks of personal computers in the manner many application programs tend to operate.

SUMMARY OF THE INVENTION

The teachings of the invention contemplate, in the preferred embodiment, a modified device driver software program for an external hard disk drive coupled to a MacIntosh personal computer running the MacIntosh operating system. According to the teachings of the invention, the standard driver code for the external hard disk drive is modified to manage a multi-block cache of random access memory storage locations on the motherboard. This reserved cache address base is contiguous to the memory locations in which the driver code itself is stored at boot time. That is, at boot time the driver code is read into the motherboard RAM from the boot block on the hard disk drive connected to the MacIntosh through the SCSI Interface. The driver code contains instructions to the CPU operating system telling the operating system how big the driver is. The size specified is equal to the size of the driver code plus the size of the cache. These instructions can be modified to reserve any size cache desired. In the preferred embodiment, a block of addresses approximately 2,000 bytes in size, plus or minus a few hundred bytes is reserved for the cache which is big enough to store four blocks of data. In other embodiments, the driver code may manage multiple caches where multiple external hard drives are used and where each cache is assigned to one external hard drive. In still other embodiments, a single cache may be used which is shared between multiple external hard drives. Each time the hard drive to which the read request is directed from the operating system changes, the shared cache will be invalidated by setting a flag and ultimately will be refilled with several sequential blocks of data from the new data storage peripheral being addressed.

The cache management code carries out read requests and write requests. This cache management code determines whether the number of blocks requested is greater than the cache size. Typically the cache size is four blocks in the preferred embodiment, but as noted above, the size of the cache can be varied. If the number of blocks needed is greater than the cache size, the request is filled by carrying out the requested transaction directly with the drive. If it is a read request, the number of blocks requested are read from the drive and copied directly to the storage locations designated in the request by the operating system.

If the number of blocks requested is less than the cache size, the cache management code then determines whether the request is a read request or a write request. If it is a write request, the cache is turned off and the write transaction to the external hard drive is carried out.

Next, the cache management code determines whether or not the cache is "on". This means that the data in the cache is valid and available for reading. The cache is turned "off" by setting data in an "on/off" byte whenever a write occurs to the external hard drive corresponding to the hard drive from which the data in the cache was copied since any write operation to the external hard drive may invalidate the data currently stored in the cache.

If the cache management program determines that the cache is on, the program determines whether or not the read request is directed to the same hard drive from which the data currently stored in the cache came. If the drive ID in the request matches the drive ID for the data stored in the cache, the cache management program determines whether or not the requested data block is currently stored in the cache. If it is, the requested data block (or blocks) is retrieved from the cache and put into the file system buffer designated by the operating system in the read request. Other code in the cache management program loads the cache with a sequential group of blocks of data if the requested block or blocks is not currently stored in the cache under predetermined conditions.

DETAILED DESCRIPTION OF THE DRAWINGS

Figure 1:
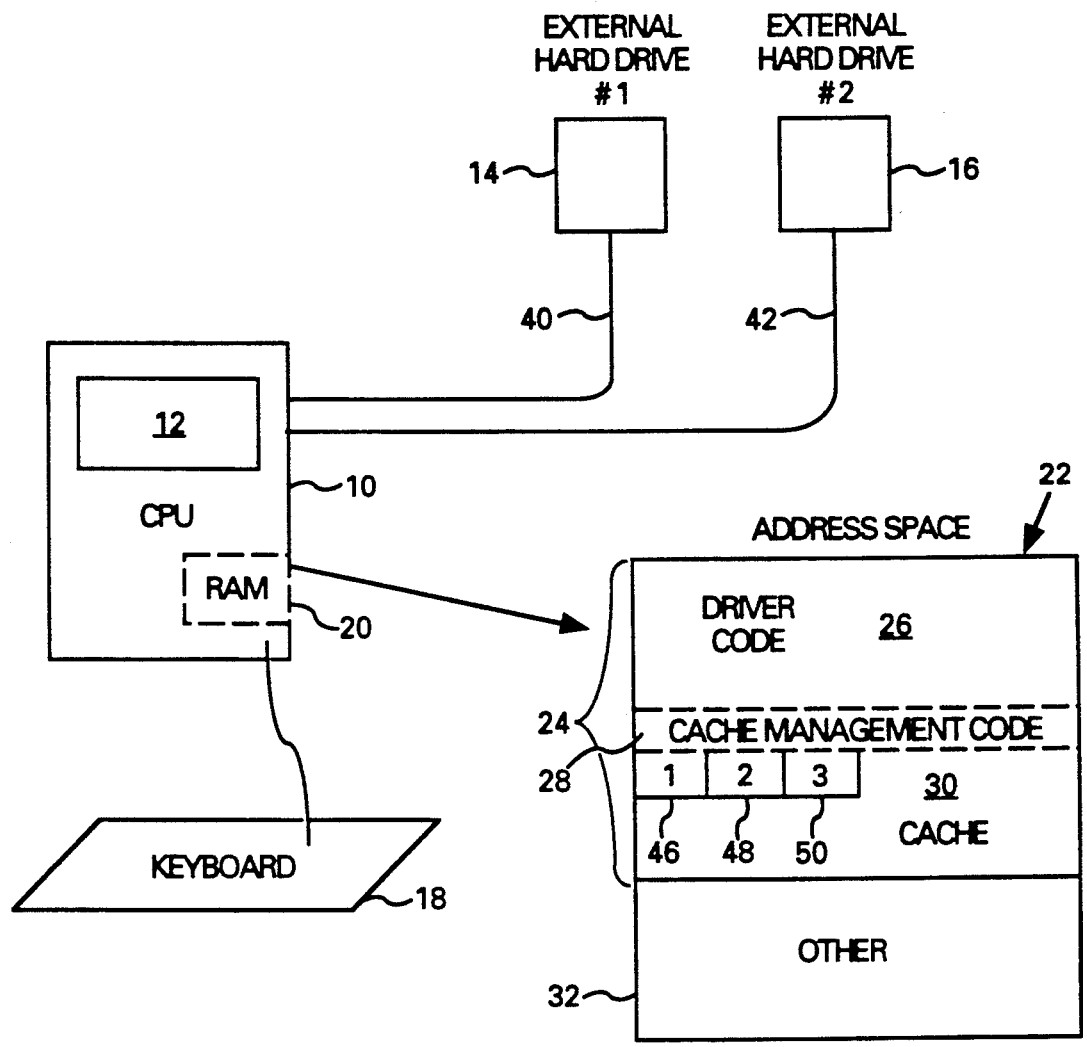
FIG. 1 is a block diagram showing the hardware arrangement in which the software implementing the teachings of the invention resides. The embodiment shown in FIG. 1 is a single software cache shared between two external hard drives.

Referring to FIG. 1, there is shown a block diagram illustrating the arrangement of hardware in which the software program which implements the teachings of the invention resides. The invention has particular applicability to MacIntosh computer systems and the MacIntosh operating system environment when working with an external hard disk drive where the probabilities indicate that a larger percentage of the time application programs request data blocks sequentially one block at a time. However, the teachings of the invention may also be employed in other operating system environments where application programmers write programs which have a tendency to request blocks of data from external disk drives one block at a time in sequential order.

Figure 3A:
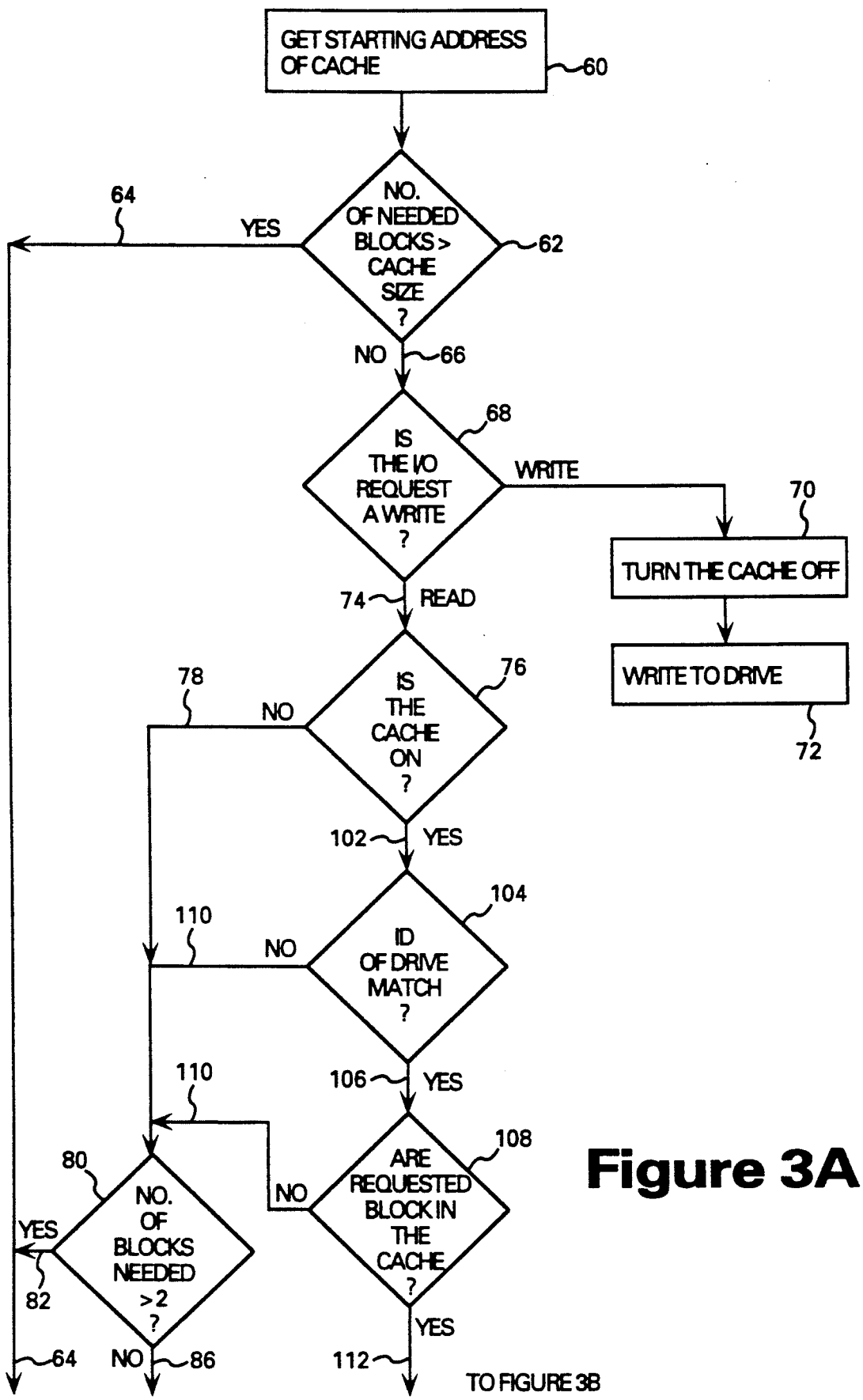
FIGS. 3A and 3B are a flow chart of the software which implements the software cache according to the teachings of the invention. This software is resident in a software driver which controls input/output transactions between an external hard disk drive and the motherboard of the central processing unit. The object code for an exemplary embodiment of the program is given in Appendix A.
Figure 3B:
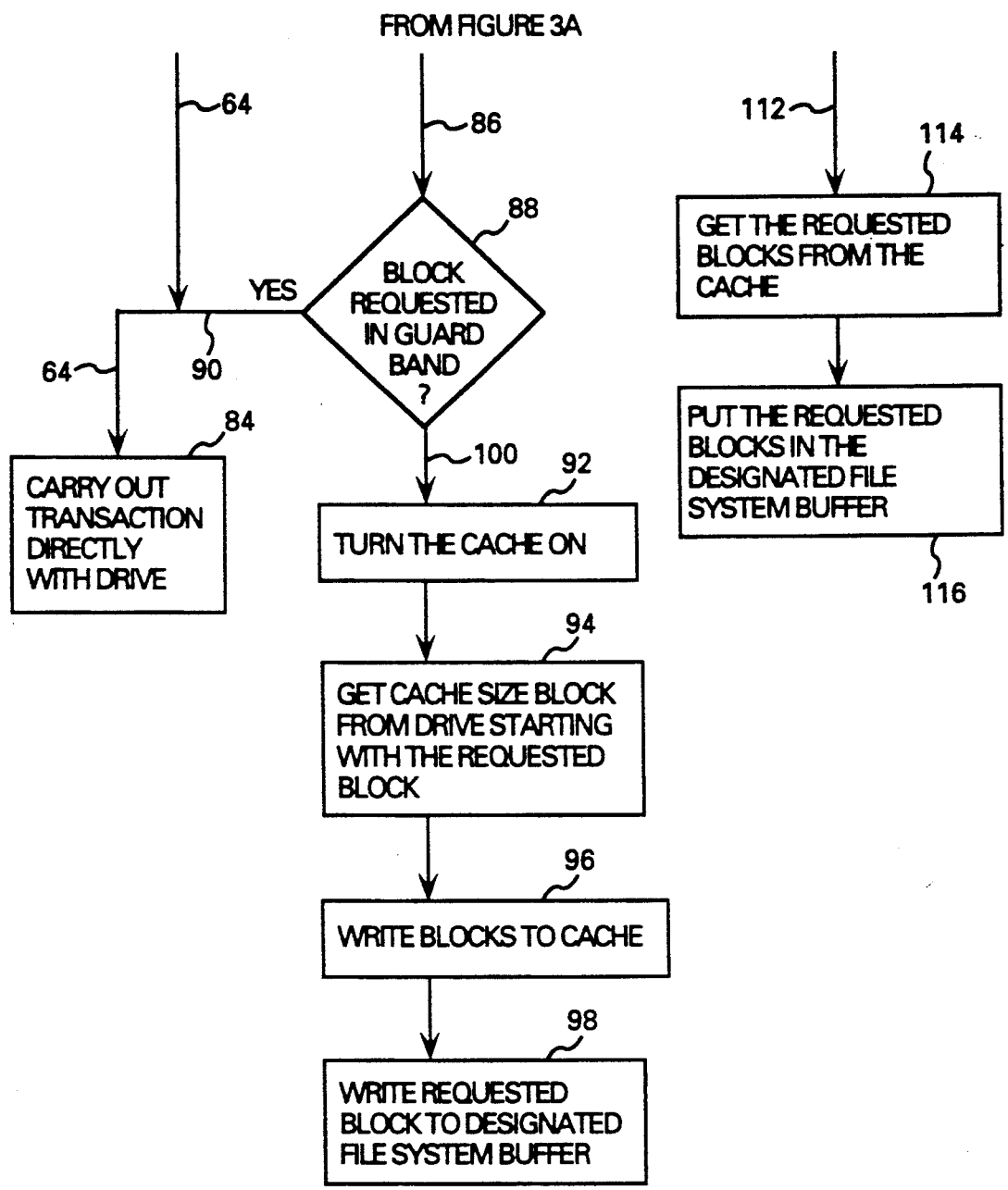

In FIG. 1, a central processing unit 10 having a display 12 is coupled to external hard disk drives 14 and 16 and a keyboard 18. The central processing unit has a motherboard (not shown) which includes a large block of random access memory 20. This random access memory 20 is loaded at power up time with the operating system programs, and various support programs such as drivers for the various peripherals including a driver program 26 including a cache management program 28 which are shared by the external hard disk drives 14 and 16. The address space, shown generally at 22, symbolizes the address space of addressable storage locations for random access memory 20. At boot time (typically power up or system reset) a portion of the address space is reserved by the operating system for the driver program which controls input/output transactions with the external hard disk drives 14 and 16. The section of the address space reserved by the operating system for the hard disk driver code is symbolized by block 24. The portion of the driver code which interfaces with the operating system to help manage the input/output transactions with the external hard disk drives 14 and 16 is symbolized by block 26. There is a portion of the driver code 26 which implements the teaching of the invention to manage a multiblock cache to speed up read transactions. This portion is described in the flow chart of FIG. 3A and 3B and the accompanying text description below, and is symbolized by block 28. The object code for an actual program implementing the cache management code for which FIGS. 3A and 3B are a flow chart is given in Appendix A. The block of addresses reserved for the software cache is part of the block 24 of addresses reserved for the driver code and is symbolized by block 30.

The block of address spaces shown at 32 is for storage of other programs such as application programs, operating system programs or other drivers.

Figure 2:
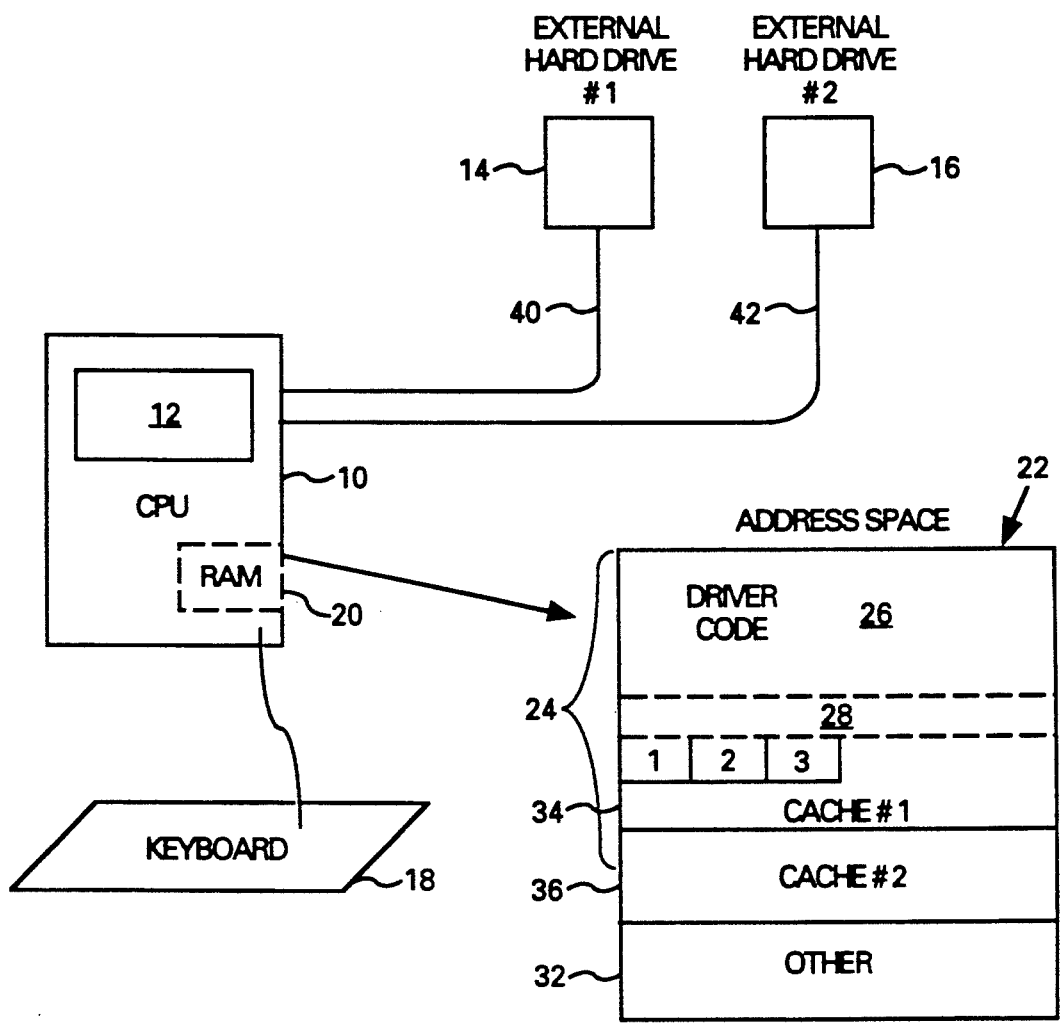
FIG. 2 is a block diagram similar to that shown in FIG. 1 except that two individual software caches are used, each assigned to one of two external hard drive disk storage units.

The embodiment shown in FIG. 1 uses a single block of address space to implement the cache. The cache 30 is then shared between the external hard drives 14 and 16. In other embodiments, such as the embodiment shown in FIG. 2, the driver code 24 reserves two separate blocks of memory in which separate cache spaces 34 and 36 are implemented.

In the world of personal computer application software in general, and MacIntosh application programs in particular, it has been found statistically that programmers tend to write their application programs to request blocks of data from disk storage sequentially one block at a time with some manipulation being performed on the data between requests. This is not the most efficient way to request data from slower peripherals, especially external hard drives such as drives 14 and 16 and FIGS. 1 and 2. External hard drives are connected to MacIntosh computers via a standard interface known as SCSI. When an input/output transaction must be performed with an external hard drive via the SCSI Interface, approximately 20 milliseconds of overhead time is consumed in setting up the transaction. The actual data transfer to or from the external hard drive takes only approximately 0.5 milliseconds. Accordingly, if data blocks are requested sequentially but only one block is requested at a time, a 20 millisecond overhead penalty is paid for each such request.

The applicants realized that input/output transaction processing can be substantially speeded up by reading data from external hard drives in groups comprising multiple sequential blocks and storing this data in a cache comprised of random access memory on the motherboard. Then, as data blocks are requested individually, software according to the teachings of the invention may first check the cache of data blocks previously stored in random access memory to determine if the requested block is present in the cache and is eligible for reading. If it is, the data may be transferred from the RAM location in the cache to another random access memory location designated by the operating system in the read request and hereafter referred to as the file system buffer. The requesting application program may then have access to the requested data without having to pay the 20 millisecond overhead penalty in getting this block of data from the external hard drive. If, however, the requested block of data is not currently stored in the cache memory, then an input/output transaction must be performed with the external hard drive to obtain the requested block of data, and, under some conditions, the cache is reloaded with a group of sequential blocks of data starting with the requested block number. Generally speaking each block is numbered and contains 512 bytes of data. The external hard disks will each store a plurality of these blocks.

The driver code 26 including the cache management code 28 is stored in block 0 of one of the external hard drives 14 or 16. At boot time, the operating system reads block 0 of the external hard drive and brings in the driver code through the SCSI Interface. The data in block 0 is read by the operating system to learn the address on disk where the driver program starts and how big the driver program is. The operating system then reserves a section in random access memory 20 on the motherboard to store the driver code. The data in block 0 that indicates the size of the driver is modified according to the teachings of the invention to reserve a block of space which is larger than the driver program itself so as to include a block of extra memory which is used by the cache management code 28 in the driver as a cache memory.

In the preferred embodiment, the amount of random access memory reserved for the cache is approximately 2,000 bytes. The driver size data in block 0 may be modified however to reserve a cache of any size. Further, the driver size data in block 0 may be used to reserve 0 multiple blocks of addresses each of which is managed as an independently operating cache assigned to one external disk drive. In the embodiment shown in FIG. 2, cache number 1, represented by the block of addresses at 34 is a lookahead cache storing data from external hard drive 14. Likewise, cache number 2, represented by the block of addresses at 36, serves as a lookahead cache to store data read from the external hard drive 16.

Three sections of the address space, labeled with reference numerals 46, 48 and 50 in FIG. 1 are used by the cache management code 28 to manage the cache address space 30. In a preferred embodiment, sections 46 and 48 of the address space are single bytes while section 50 of the address space is a 4 byte group. Section 46 is used to store the on/off byte. This byte is used as a flag by the cache management code to determine whether the data stored in the cache 30 is valid or not. The data stored in the cache will be valid so long as there has not been a write transaction to the disk from which the data stored in the cache 30 was read subsequent to the time that the data stored in the cache 30 was copied from the corresponding disk. For example, if the cache 30 is currently storing 4 blocks of data read from external hard drive 14 and there has been no write transaction to external hard drive 14 since the time that the 4 blocks were read, then it is assumed that the data on the disk 14 corresponds to the data in the cache 30 and the cache will be deemed "on". If however there has been a write transaction to hard disk 14 subsequent to the time that the 4 blocks of data were read from the external hard drive 14 into the cache 30, then it will be assumed by the cache management code 28 that the data stored in the cache 30 is no longer valid regardless of whether or not the write transactions to the external hard drive 14 actually changed the data on the disk which corresponds to the data in the cache 30. In such a case, the cache will be deemed "off" to prevent the possibility of obsolete data being read from the cache and used by the application program when the actual data on the external hard drive is different.

Section 48 of the address space is the identification code used by the SCSI Interface to identify the external hard drive from which the data stored in the cache 30 was read. In the embodiment shown in FIG. 2, where each cache is assigned to a single external hard drive, section 48 of the address space is not necessary because each cache stores data from only one drive. In the embodiment of FIG. 1, when the central processing unit 10 addresses external hard drive 16 after the cache 30 has been loaded with data from external hard drive 14, the mismatch in identification codes between the identification code in the I/O request and the identification code in section 48 of the address space will usually cause the cache 30 to be flushed and refilled with new data from external hard drive 16 and will always prevent the data in the cache from being read. The preferred embodiment is shown in FIG. 1 since it is rare to switch between external hard drives during execution of any particular application program.

Section 50 of the address space stores a 4 byte group which is the address on the hard drive which corresponds to the first block of data stored in the cache 30.

Referring to FIGS. 3A and 3B, there is shown a flow chart of the cache management code 28 of the embodiment of FIG. 1. The first step carried out by the cache management code is to get the starting address of the block of addresses reserved for the cache memory. This step is symbolized by block 60, and results in return of the address in random access memory 20 for the on/off byte 46 which represents the first byte in the cache 30. This is done by getting the address in random access memory 20 for the first byte of the driver code 26 and calculating the address for the on/off byte 46. To do this the cache management code 28 asks the driver code 26 where the driver code is located in the address space 22. The driver 26 then requests this information from the operating system. The operating system knows where in the address space each program is located, and returns the address of the first byte of the driver code 26 to the driver. Because the length of the driver code is known, the address for the on/off byte 46 can be calculated by adding the length of the driver code to the absolute address of the first byte of the driver received from the operating system.

Next, the test of block 62 is performed to determine whether the number of blocks involved in the I/O transaction is greater than the cache size. Typically, a 2,000 byte cache will be capable of storing 4 blocks of data of about 500 bytes per block. The actual size of each block is 512 bytes so the actual size of a 4 block cache will be 4 times 512. If a read request to an external hard drive calls for more than 5 blocks for a 4 block cache, the test of 62 causes the cache to be bypassed and causes the data to be retrieved directly from the hard disk. This result is symbolized by path 64. If the number of blocks needed is less than the cache size, processing flows along path 66 to the test of block 68.

Block 68 determines whether or not the I/O request is a read or write transaction. If the request is a write transaction, processing flows to block 70 where the cache is turned off. The reason for this is that if a write transaction is to be performed to alter the data stored on the hard disk, the data stored in the cache is thereby rendered questionable. Block 70 represents the process of addressing the on/off byte 46 and altering the data stored there to indicate an off status.

After turning the cache off, block 72 is performed representing the process of writing the desired data to the hard disk. Preferably this is done via the SCSI Interface but the teachings of the invention are also applicable to internal Winchester disk drives as well as to interfaces to other types of data storage peripherals.

If step 68 determines that the I/O request is a read transaction, processing flows on path 74 to the test of block 76.

The test of block 76 determines whether the cache is on. This means that the on/off byte 46 is read to determine whether or not the data stored in the cache 30 is valid or not. If it is determined that the cache is turned off, processing flows via path 78 to the test of block 80.

The test of block 80 determines whether the number of blocks requested is greater than 2, the reason for this test is to maximize the efficiency of the cache operation. Because of the overhead costs of first moving a 4 block group of data bytes to the cache 30 from the hard disk upon which it is stored and then moving the requested block or blocks of data from the cache memory to the file system buffer designated in the I/O request, it is advantageous to use the cache only for read requests of 1 or 2 blocks of data. If the read request is for more than 2 blocks of data, it is more efficient to obtain the data directly from the hard disk. Thus, if test 80 determines that the read request is for more than 2 blocks of data, processing flows via path 82 and 64 to block 84 on FIG. 3B.

Block 84 represents the process of carrying out an input/output transaction directly with the drive. The process of block 84 is conventional and well known to those skilled in the art. Note that the test of block 80 will only be reached if the I/O request is a read transaction and the cache is turned off or there is an ID mismatch (step 104) or the requested data is not in the cache (step 108). This means that the cache must be reloaded with new data. The test of block 80 insures that the cache is reloaded with new data only when the read request is for 2 blocks or less for the reasons detailed above. In such a case processing flows via path 86 to the test of block 88 in FIG. 3B. The purpose of the test symbolized by block 88 is to prevent use of the cache if the requested block number is within a "guard band" symbolizing the 4 blocks closest to end of the blocks stored on the hard disk (for a 4 block cache). The test of block 88 is a calculation. The calculation compares the block number for the starting block in the read request to the range defined by the largest numbered block on the disk and by the block number equal to the highest numbered block on the disk minus the number of blocks in the cache. Therefore, if there are 2,000 blocks stored on a disk, and the cache size is 4 blocks, then the guard band will be from block number 1997 to block 2000. If the requested block number is 1998, processing flows via path 90 and path 64 to block 84 where the requested blocks are read directly from the disk.

If the requested block is not within the guard band, processing proceeds to block 92 where the cache is turned on by addressing the on/off byte 46 and altering the data therein to indicate an on status.

Next, a number of blocks of data equalling the maximum number of blocks which can be stored in the cache are read from the hard disk addressed by the read request in a conventional manner as symbolized by block 94. These blocks are written into the cache 30 as symbolized by block 96. Finally, in block 98, the requested block or blocks of data are taken out of the cache 30 and written to the designated file system buffer specified in the read request.

Returning to the consideration of FIG. 3A, the path 102 from the test of block 76 is taken only if the cache is turned on and the I/O request is a read transaction. If such is the case, the test of block 104 is performed wherein a comparison is made between the identification code of the drive specified in the read request is compared to the identification code of the drive from which the data currently stored in the cache was obtained. If there is a match, path 106 is taken to the test symbolized by block 108. If there is no match, path 110 is taken to the test of block 80, and processing proceeds as described above for block 80 and the other blocks associated therewith. If the test of block 104 indicates there is an identification mismatch, then the data stored is cache is not eligible for use and the cache must be reloaded. This step is also necessary for the multiple cache embodiment illustrated in FIG. 2, especially if multiple caches are used for a single drive. For each of these cache management programs, the step 60 symbolizes the process of getting the starting address of the appropriate cache to which the program is associated. In alternative embodiments, a single cache management program can be shared between the multiple caches and a suitable branching step matching the drive identification and the read request to the appropriate corresponding cache and the corresponding cache management program will be added.

The test of block 108 determines whether the requested block in the read request is stored in the cache. If the answer is no, processing proceeds along path 110 to the test of block 80 for purposes of reloading the cache. If the answer is yes, processing proceeds along path 112 to block 114 wherein the requested blocks of data are retrieved from the cache 30. The requested blocks of data are then put in the designated file system buffer specified in the read request as symbolized by block 116.

Although the invention has been described in terms of preferred and alternative embodiments disclosed herein, those skilled in the art will appreciate numerous modification, additions or deletions which may be made without departing from the spirit and scope of the invention. All such additions, modifications and deletions are intended to be included within the scope of the claims appended hereto.

What is claimed is:

1. An apparatus for speeding up read transactions between a host computer and a rigid-disk, direct-access storage device which stores data as sequential blocks, said host computer having in execution thereon an operating system and having a random access memory means for storing data and program information, said host computer having in execution thereon a driver program stored in said random access memory means, said driver program for controlling operations by said rigid-disk, direct-access storage device which stores data in continuous blocks, said apparatus for speeding up read transactions comprising:

a reserved portion of said random access memory means of said host computer, said reserved portion of said random access memory means having a first portion reserved for storing a cache of data retrieved from said rigid-disk, direct-access storage device and having a second portion reserved for storing said driver program being executed by said host computer;

said driver program in execution on said host computer including a cache management program for sending a command to said operating system causing said operating system to reserve said reserved portion of said random access memory so as to have sufficient capacity in said portion to store said driver program and so as to have sufficient capacity in said first portion for operation as a cache memory by storing said cache of data retrieved from said rigid-disk, direct-access storage device, said cache management program for managing said first portion of said reserved portion of said random access memory means as a cache memory so as to speed up the process of reading data blocks from said rigid-disk, direct-access, storage device by storing multiple, sequential blocks of data retrieved from said rigid-disk, direct-access storage device, and, upon receiving a read request, for determining if the desired blocks of data are stored in said first portion of said random access memory reserved as a cache memory, and if the data requested by said read request is stored in said first portion of said random access memory reserved as a cache memory, for retrieving the requested data from said portion of said random access memory reserved as a cache instead of from said rigid-disk, direct-access storage device.

2. The apparatus of claim 1 wherein said rigid-disk, direct-access, storage device is an external peripheral of said host computer, and wherein said cache management program includes a cache setup computer program which, at the time when power is first applied to said host computer, is stored on said rigid-disk, direct-access, storage device and, as part of a boot up process carried out by said host computer, said cache set-up computer program is executed by said host computer thereby causing said message to be sent to said operating system which causes said operating system to reserve said reserved portion of said random access memory means.

3. The apparatus of claim 2 wherein said rigid-disk, direct-access, storage device is coupled to said host computer by a SCSI interface.

4. The apparatus of claim 3 further comprising a second rigid-disk, direct-access, storage device coupled to said host computer by a SCSI interface, and wherein said cache setup computer program includes means for sending a message to said operating system to cause said reserved portion of said random access memory to contain sufficient memory storage locations to store said cache management program with sufficient extra memory storage locations to act as a cache memory for each of said rigid-disk, direct-access, storage device, and wherein said cache management program includes means for managing a portion of said reserved portion of said random access memory as a cache memory for each said rigid-disk, direct-corresponding rigid-disk, direct-access, storage device.

5. The apparatus of claim 2 wherein said rigid-disk, direct-access storage device is coupled to said host computer by a SCSI interface, and wherein said random access memory means is part of said host computer and is the only random access memory means used to store data read from said rigid-disk, direct-access, storage device.

6. The apparatus of claim 5 wherein said cache setup computer program causes said operating system to reserve enough storage locations in said random access memory means for storing a plurality of blocks of data from said rigid-disk, direct-access, storage device.

7. The apparatus of claim 2 wherein said host computer is a Macintosh personal computer, and wherein said rigid-disk, direct-access, storage device is an external peripheral coupled to said host computer by a SCSI interface and having a removable cartridge magnetic media, and wherein said random access memory means is part of said host computer and is the only random access memory means used to store data read from said rigid-disk, direct-access, storage device.

8. In a computer having an operating system in execution thereon and having a rigid-disk, direct-access storage device which stores multiple blocks of data and which is coupled to said computer by an interface, said computer having random access memory storing said operating system and storing a driver program in execution on said computer for managing operations of said rigid-disk, direct-access storage device, and said computer not having a cache memory, the improvement comprising:

a modified portion of said driver program in execution on said computer for cooperating with said operating system to reserve a portion of the memory locations in said random access memory comprising a first portion large enough to store both said driver program including said modified portion thereof and a second portion of said random access memory to act as a cache memory and which is large enough to store a plurality of blocks of data read from said rigid-disk, direct-access storage device, said modified portion of said driver program also for managing said second portion of said reserved memory locations as a cache memory so as to speed up read transactions carried out by said operating system and said driver program with said rigid-disk, direct-access storage device by storing data retrieved from said rigid-disk, direct-access storage device in response to a read request from said operating system in said second portion of said random access memory under predetermined conditions, and by retrieving data requested in a read request issued to said rigid-disk, direct-access storage device from said second portion of said random access memory when said data requested in said read request is stored in said second portion and said requested data stored in said second portion of said random access memory is identical to the requested data stored in said rigid-disk, direct-access storage device thereby avoiding the overhead of setting up a transaction across said interface to retrieve said requested data directly from said rigid-disk, direct-access storage device, and thereby speeding up at least some read transactions by converting said computer without a cache memory into a computer with a cache memory.

9. The apparatus of claim 8 wherein said interface between said rigid-disk, direct-access storage device and said computer is a SCSI interface, and wherein said rigid-disk, direct-access storage device stores data in blocks, and wherein said predetermined conditions include the condition that the modified portion of said driver program will not store data read from said rigid-disk, direct-access storage device in said second portion of said random access memory as a cache memory if the number of blocks of data requested in said read request is greater than two.

10. An apparatus comprising:
a host computer having random access memory;
a disk drive having a storage medium embodied in a removable cartridge, and coupled to said host computer by a SCSI interface, said disk drive for storing data on said storage medium, said data organized on said storage medium as a plurality of blocks, each block having an address;
an operating system program or programs executed by said host computer to manage said random access memory and carry out read and write transactions with said disk drive by issuing read requests and write requests, at least said read requests specifying the address or addresses of the one or more blocks of data to be read from said disk drive;
an application program in execution on said host computer for controlling said host computer and for generating requests to said operating system to read data blocks from said disk drive;
a driver program for said disk drive in execution on said host computer for cooperating with said operating system program or programs and said application program for controlling the operations of said disk drive so as to carry out read and write transactions, and for cooperating with said operating system to reserve a portion of said random access memory for use as a cache and to store said driver program, the size of said portion of said random access memory reserved as a cache being such that the reserved portion is capable of storing a plurality of blocks of data read from said disk drive from sequential storage locations on the storage medium thereof as well as the address or addresses on said disk drive on the data blocks stored in said cache, said driver program also for managing said reserved portion of said random access memory as a cache by carrying out the following operations:

intercepting all rad requests directed to said disk drive by said application program via said operating system determining whether the data in said cache is possible invalid by examining a cache status flag for the presence of an off condition indicating that there has been a write transaction to said disk drive since the last read transaction during which the data currently stored in said portion of said random access memory reserved as a cache was stored therein.

examining the address in said intercepted read request of the requested data block(s) on said disk drive, and checking whether the address of the requested data block(s) specified in said read request matches the address of any data block stored in said cache, if either there has been a write transaction to said disk drive since the time when the data blocks stored in said portion of random access memory reserved as a cache were stored therein, or the requested data block(s) are not currently stored in said portion of random access memory reserved as a cache, determining if more than one data block has been requested in said read request, and, if so, if the number of blocks of data requested in said read transaction is greater than a predetermined number where the efficiency of carrying out the read transaction directly with said disk drive is greater than storing the requested blocks of data in said portion of random access memory reserved as a cache first, and then transferring the requested block(s) of data to the program that made the read request, if the number of blocks of data requested in said read request is greater than said predetermined number, causing the requested blocks of data to be retrieved directly from said disk drive and transferred to the program which requested said data, if the number of blocks of data requested in said read request is less than said predetermined number, setting said cache status flag to an on condition indicating that the data stored in said portion of said random access memory reserved as a cache is in agreement with the corresponding data stored on said disk drive, and then causing a number of sequential blocks of data large enough to fill said cache and starting with said requested block(s) of data to be retrieved from said disk drive and stored in said portion of said random access memory reserved as a cache, and supplying from said portion of random access memory reserfved as a cache said requested data to whatever program that requested said data, thereby eliminating the time it takes to set up a disk access transaction through said SDSI interface and speeding up at least some read transactions.

11. An apparatus comprising:

a host computer having random access memory;

a disk drive having a storage medium to which blocks of data may be written and stored in nonvolatile fashion, and from which blocks of data may be read, said disk drive coupled to said host computer by an interface;

an operating system program or programs executed by said host computer to manage operations by said host computer and allocate storage locations on said random access memory and said disk drive;

an application program for cooperating with said operating system program(s) to control said host computer and read data blocks from said disk drive;

driver means for cooperating with said operating system program or programs for managing said disk drive and for reserving as a cache a portion of said random access memory large enough to store at least a plurality of blocks of data read from said disk drive and managing said reserved part of said random access memory as a cache thereby speeding up read transactions between said application program and said disk drive.

12. The apparatus of claim 11 wherein said interface is a SCSI interface.

13. A process of converting a computer having an operating system and a rigid-disk, direct-access storage device having an interface and having a driver program which cooperates with said operating system to control said rigid-disk, direct-access storage device so as to perform read and write transactions requested by an application program being executed by said computer, said process for converting said computer having a random access memory but not having a separate cache memory, into a computer with a cache memory by reserving a portion of said random access memory and managing said reserved portion as a cache memory said process comprising the steps of:

executing a portion of said driver program with said computer t the time power is first applied to said computer so as to send a message to said operating system to cause said operating system to reserve a portion of said random access memory sufficiently large to serve as a cache to store a plurality of blocks of data;

managing said reserved portion of said random access memory as a cache to speed up the average read access time over a plurality of read requests by storing sequential blocks of data read from said rigid-disk, direct-access storage device starting with the requested block under predetermined conditions whenever the number of requested blocks in the read request is smaller than a predetermined number, and intercepting all read requests and retrieving the requested block(s) of data from said portion of said random access memory reserved as a cache whenever it is possible to retrieve data from said portion of said random access memory reserved as a cache that is identical to the corresponding data stored on said rigid-disk, direct-access storage device thereby avoiding the delay of setting up a read transaction via the interface between said computer and said rigid-disk, direct-access storage device.

14. A process as defined in claim 13 wherein said rigid-disk, direct-access storage device stores data in numbered blocks, each said block having a number, said block numbers ranging from a lowest block number to a highest block number, and wherein said portion of said random access memory reserved as a cache memory is capable of storing up to a predetermined maximum number of blocks of data, and wherein a memory location in said portion of said random access memory reserved as a cache memory is reserved as a status flag, the state of said status flag defining whether any data stored in said cache memory is available for reading by said computer, and wherein data is read from said rigid-disk, direct-access storage device by a read request that identifies the block number(s) of the block(s) to be read from said rigid-disk, direct-access storage device and an address of a file system buffer to which the requested data is to be written, and wherein data blocks are written to said rigid-disk, direct-access storage device using write requests which identify the block numbers of blocks of data to be recorded on said rigid-disk, direct-access storage device, and wherein said step of managing said reserved portion of said random access memory as a cache includes the following steps:

(1) determining whether a rad or write transaction being carried out by said computer will involve transfer of a number of blocks from or to said rigid-disk, direct-access storage device which is more than the maximum number of blocks of data than ca be stored in said cache memory;

(2) if the read or write transaction will involve transferring more blocks of data than can be stored in said cache memory, carrying out a read or write transaction directly with the rigid-disk, direct-access storage device;

(3) if said read or write transaction will not involve transferring more blocks of data than the maximum number of blocks that can be stored in said portion of said random access memory reserved as a cache memory, determining whether the read or write transaction is a read request or a write request;

(4) if the requested read or write transaction is a write request, setting to "off" said status flag which signals whether the data in said cache memory is or is not available for a read transaction from said cache memory thereby rendering any data stored in said cache memory ineligible for use and writing the data specified in said write request to said rigid-disk, direct-access storage device;

(5) if the read or write transaction is a read request, checking the value of said status flat for "on" status signalling that data stored in said cache memory is eligible for reading;

(6) if any data in said cache memory is eligible for reading and the read or write transaction is a read request, determining whether the blocks of data specified in said read request are stored in said cache memory;

(7) if the blocks of data specified in the read request are stored in said cache memory and are eligible for reading, reading the blocks of data specified in said read request from said cache memory and storing the data specified in said read request in a storage location specified in the read request;

(8) if it is determined that a read request is pending and said status flag is in an "off" state, meaning any data in said cache memory is not eligible for reading, or if it is determined that the data specified in said read request is not stored in said cache memory, determining whether the number of blocks of data requested in said read request is greater than said maximum number of blocks;

(9) if the number of blocks of data specified in said read request is greater than said maximum number, reading the blocks of data specified in said read request directly from said rigid-disk, direct-access storage device;

(10) if the number of blocks of data specified in said read request is less than said maximum number, determining whether the block number of the first data block specified in said read request is between the largest numbered block stored in said rigid-disk, direct-access storage device and a number defined as the largest numbered block for data stored on said data storage peripheral minus the maximum number of blocks which can be stored in said cache memory thereby defining a guardband;

(11) if the block number of the first block of data specified by said read request is within said guardband, reading the blocks of data specified in said read request directly from said storage peripheral;

(12) if the block number of the first block of data requested by said read request is not within said guardband, setting said status flat to an "on" status indicating that data stored in said cache memory is eligible for reading, and reading a number of sequentially numbered blocks of data from said rigid-disk, direct-access storage device, and storing said blocks of data in said cache memory and, then writing the block or blocks of data specified in said read request from said cache memory to the address of said file system buffer specified in said read request.

* * * * *